US012554970B2

(12) United States Patent
Musaddiq et al.

(10) Patent No.: US 12,554,970 B2
(45) Date of Patent: *Feb. 17, 2026

(54) READ-MODIFY-WRITE FOR LOSSLESS TILING IN CONVOLUTION NETWORKS

(71) Applicant: SambaNova Systems, Inc., Palo Alto, CA (US)

(72) Inventors: Matheen Musaddiq, Austin, TX (US); Tien-Shuo Chang, Palo Alto, CA (US); Adi Fuchs, Palo Alto, CA (US); Sitanshu Gupta, Palo Alto, CA (US); Ram Sivaramakrishnan, San Jose, CA (US); Raghu Prabhakar, San Jose, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/779,781

(22) Filed: Jul. 22, 2024

(65) Prior Publication Data

US 2026/0023954 A1    Jan. 22, 2026

(51) Int. Cl.
*G06N 3/0464* (2023.01)
*G06F 12/02* (2006.01)
*G06N 3/084* (2023.01)

(52) U.S. Cl.
CPC ......... *G06N 3/0464* (2023.01); *G06F 12/023* (2013.01); *G06N 3/084* (2013.01)

(58) Field of Classification Search
CPC ........ G06N 3/0464; G06N 3/084; G06N 3/02; G06N 3/082; G06N 3/045; G06F 12/023; G06F 16/9024; G06F 15/7839; G06F 15/7892; G06F 17/16; G06F 18/214; G06F 2015/763; G06T 1/20; G06T 3/4038; G06V 10/454
See application file for complete search history.

(56) References Cited

U.S. PATENT DOCUMENTS

| | | | |
|---|---|---|---|
| 11,250,061 B1* | 2/2022 | Nama | G06N 3/084 |
| 2020/0082243 A1* | 3/2020 | Jin | G06F 17/16 |
| 2020/0160226 A1* | 5/2020 | Ross | G06N 3/04 |
| 2020/0272892 A1* | 8/2020 | Desappan | G06F 12/0804 |
| 2021/0141571 A1* | 5/2021 | Lew | G06F 9/3001 |

(Continued)

*Primary Examiner* — Michael Krofcheck
(74) *Attorney, Agent, or Firm* — FP; Sikander M. Khan; Joachim Erhard Pistof

(57) ABSTRACT

A data processing system that implements an improved read-modify-write operation for lossless tiling in convolution networks is presented. The data processing system includes runtime logic that is configured to execute a graph to generate at the output of the graph, a plurality of tiles of a tensor, initialize a memory comprising all zeros for storing the plurality of tiles, determine a current memory region in the memory for storing a current tile of the plurality of tiles, wherein the current memory region comprises an overlapping memory region that stores data from write operations of previously stored neighboring tiles of the plurality of tiles and a remaining memory region, and perform a read-modify-write operation on the data from the overlapping memory region using the data from the overlapping memory region and first tile data of the current tile for storing in the overlapping memory region.

17 Claims, 9 Drawing Sheets

(56) References Cited

U.S. PATENT DOCUMENTS

| | | | |
|---|---|---|---|
| 2022/0309027 A1* | 9/2022 | Nama | G06F 15/7839 |
| 2022/0309028 A1* | 9/2022 | Nama | G06F 17/16 |
| 2022/0309318 A1* | 9/2022 | Nama | G06N 3/063 |
| 2022/0309319 A1* | 9/2022 | Nama | G06N 3/084 |
| 2022/0309323 A1* | 9/2022 | Nama | G06N 3/063 |

* cited by examiner

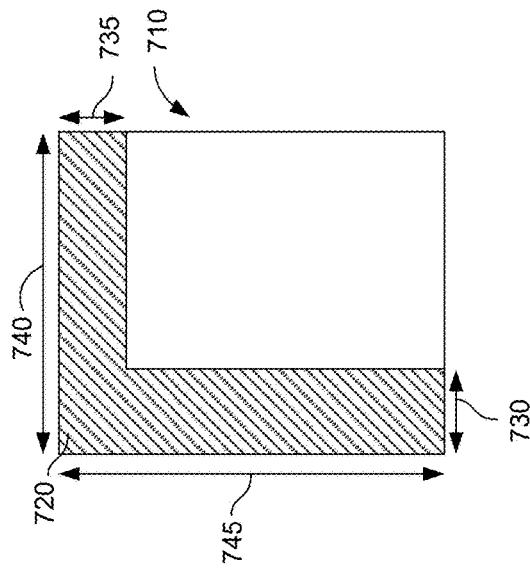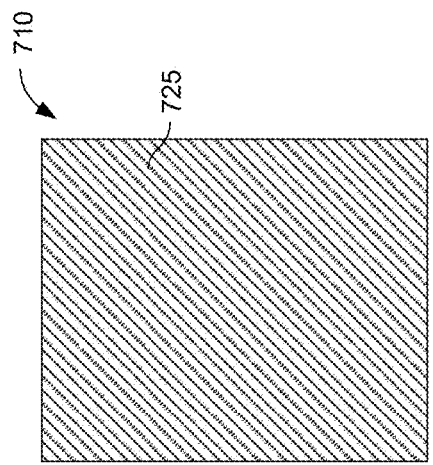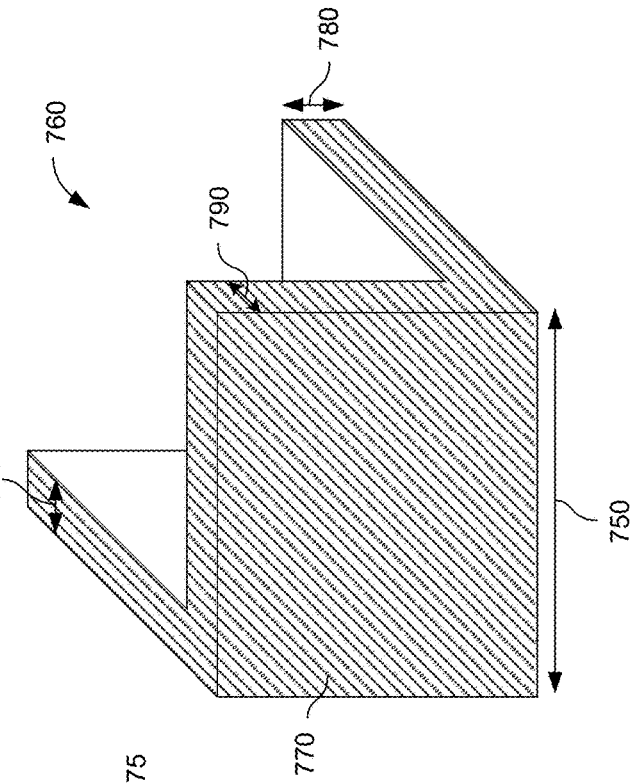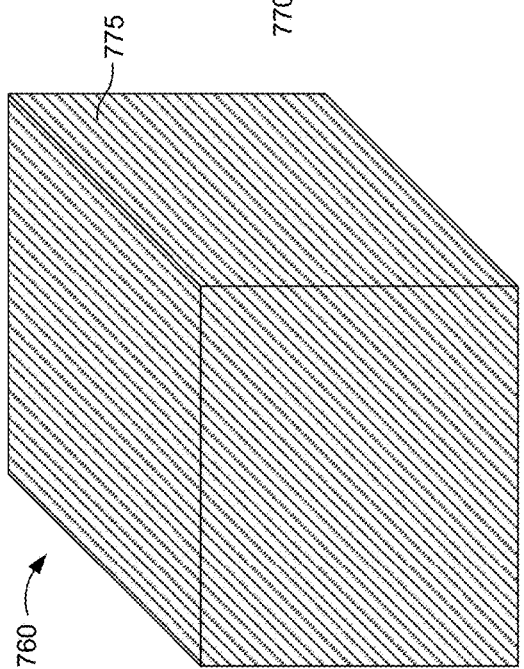
FIG. 7A
FIG. 7B

READ-MODIFY-WRITE FOR LOSSLESS TILING IN CONVOLUTION NETWORKS

RELATED APPLICATIONS AND DOCUMENTS

This application is related to the following papers and commonly owned applications:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," Proceedings Of The 39th ACM SIGPLAN Conference On Programming Language Design And Implementation (PLDI), Proceedings of the 43rd International Symposium on Computer Architecture, 2018;

U.S. Nonprovisional patent application Ser. No. 16/239,252, now U.S. Pat. No. 10,698,853 B1, filed Jan. 3, 2019, entitled "VIRTUALIZATION OF A RECONFIGURABLE DATA PROCESSOR;"

U.S. Nonprovisional patent application Ser. No. 16/862,445, now U.S. Pat. No. 11,188,497 B2, filed Nov. 21, 2018, entitled "CONFIGURATION UNLOAD OF A RECONFIGURABLE DATA PROCESSOR;"

U.S. Nonprovisional patent application Ser. No. 16/197,826, now U.S. Pat. No. 10,831,507 B2, filed Nov. 21, 2018, entitled "CONFIGURATION LOAD OF A RECONFIGURABLE DATA PROCESSOR;"

U.S. Nonprovisional patent application Ser. No. 16/198,086, now U.S. Pat. No. 11,188,497 B2, filed Nov. 21, 2018, entitled "CONFIGURATION UNLOAD OF A RECONFIGURABLE DATA PROCESSOR;"

U.S. Nonprovisional patent application Ser. No. 17/093,543, filed Nov. 9, 2020, entitled "EFFICIENT CONFIGURATION OF A RECONFIGURABLE DATA PROCESSOR;"

U.S. Nonprovisional patent application Ser. No. 16/260,548, now U.S. Pat. No. 10,768,899 B2, filed Jan. 29, 2019, entitled "MATRIX NORMAL/TRANSPOSE READ AND A RECONFIGURABLE DATA PROCESSOR INCLUDING SAME;"

U.S. Nonprovisional patent application Ser. No. 16/536,192, now U.S. Pat. No. 11,080,227 B2, filed Aug. 8, 2019, entitled "COMPILER FLOW LOGIC FOR RECONFIGURABLE ARCHITECTURES;"

U.S. Nonprovisional patent application Ser. No. 17/326,128, filed May 20, 2021, entitled "COMPILER FLOW LOGIC FOR RECONFIGURABLE ARCHITECTURES;"

U.S. Nonprovisional patent application Ser. No. 16/407,675, now U.S. Pat. No. 11,386,038 B2, filed May 9, 2019, entitled "CONTROL FLOW BARRIER AND RECONFIGURABLE DATA PROCESSOR;"

U.S. Nonprovisional patent application Ser. No. 16/504,627, now U.S. Pat. No. 11,055,141 B2, filed Jul. 8, 2019, entitled "QUIESCE RECONFIGURABLE DATA PROCESSOR;"

U.S. Nonprovisional patent application Ser. No. 17/322,697, filed May 17, 2021, entitled "QUIESCE RECONFIGURABLE DATA PROCESSOR;"

U.S. Nonprovisional patent application Ser. No. 16/572,516, filed Sep. 16, 2019, entitled "EFFICIENT EXECUTION OF OPERATION UNIT GRAPHS ON RECONFIGURABLE ARCHITECTURES BASED ON USER SPECIFICATION;"

U.S. Nonprovisional patent application Ser. No. 16/744,077, filed Jan. 15, 2020, entitled "COMPUTATIONALLY EFFICIENT SOFTMAX LOSS GRADIENT BACKPROPAGATION;"

U.S. Nonprovisional patent application Ser. No. 16/590,058, now U.S. Pat. No. 11,327,713 B2, filed Oct. 1, 2019, entitled "COMPUTATION UNITS FOR FUNCTIONS BASED ON LOOKUP TABLES;"

U.S. Nonprovisional patent application Ser. No. 16/695,138, now U.S. Pat. No. 11,328,038 B2, filed Nov. 25, 2019, entitled "COMPUTATIONAL UNITS FOR BATCH NORMALIZATION;"

U.S. Nonprovisional patent application Ser. No. 16/688,069, filed Nov. 19, 2019, now U.S. Pat. No. 11,327,717 B2, entitled "LOOK-UP TABLE WITH INPUT OFFSETTING;"

U.S. Nonprovisional patent application Ser. No. 16/718,094, filed Dec. 17, 2019, now U.S. Pat. No. 11,150,872 B2, entitled "COMPUTATIONAL UNITS FOR ELEMENT APPROXIMATION;"

U.S. Nonprovisional patent application Ser. No. 16/560,057, now U.S. Pat. No. 11,327,923 B2, filed Sep. 4, 2019, entitled "SIGMOID FUNCTION IN HARDWARE AND A RECONFIGURABLE DATA PROCESSOR INCLUDING SAME;"

U.S. Nonprovisional patent application Ser. No. 16/572,527, now U.S. Pat. No. 11,410,027 B2, filed Sep. 16, 2019, entitled "Performance Estimation-Based Resource Allocation for Reconfigurable Architectures;"

U.S. Nonprovisional patent application Ser. No. 15/930,381, now U.S. Pat. No. 11,250,105 B2, filed May 12, 2020, entitled "COMPUTATIONALLY EFFICIENT GENERAL MATRIX-MATRIX MULTIPLICATION (GEMM);"

U.S. Nonprovisional patent application Ser. No. 17/337,080, now U.S. Pat. No. 11,328,209 B1, filed Jun. 2, 2021, entitled "MEMORY EFFICIENT DROPOUT;"

U.S. Nonprovisional patent application Ser. No. 17/337,126, now U.S. Pat. No. 11,256,987 B1, filed Jun. 2, 2021, entitled "MEMORY EFFICIENT DROPOUT, WITH REORDERING OF DROPOUT MASK ELEMENTS;"

U.S. Nonprovisional patent application Ser. No. 16/890,841, filed Jun. 2, 2020, entitled "ANTI-CONGESTION FLOW CONTROL FOR RECONFIGURABLE PROCESSORS;"

U.S. Nonprovisional patent application Ser. No. 17/023,015, now U.S. Pat. No. 11,237,971 B1, filed Sep. 16, 2020, entitled "COMPILE TIME LOGIC FOR DETECTING STREAMING COMPATIBLE AND BROADCAST COMPATIBLE DATA ACCESS PATTERNS;"

U.S. Nonprovisional patent application Ser. No. 17/031,679, filed Sep. 24, 2020, entitled "SYSTEMS AND METHODS FOR MEMORY LAYOUT DETERMINATION AND CONFLICT RESOLUTION;"

U.S. Nonprovisional patent application Ser. No. 17/175,289, now U.S. Pat. No. 11,126,574 B1, filed Feb. 12, 2021, entitled "INSTRUMENTATION PROFILING FOR RECONFIGURABLE PROCESSORS;"

U.S. Nonprovisional patent application Ser. No. 17/371,049, filed Jul. 8, 2021, entitled "SYSTEMS AND METHODS FOR EDITING TOPOLOGY OF A RECONFIGURABLE DATA PROCESSOR;"

U.S. Nonprovisional patent application Ser. No. 16/922, 975, filed Jul. 7, 2020, entitled "RUNTIME VIRTUALIZATION OF RECONFIGURABLE DATA FLOW RESOURCES;"

U.S. Nonprovisional patent application Ser. No. 16/996, 666, filed Aug. 18, 2020, entitled "RUNTIME PATCHING OF CONFIGURATION FILES;"

U.S. Nonprovisional patent application Ser. No. 17/214, 768, now U.S. Pat. No. 11,200,096 B1, filed Mar. 26, 2021, entitled "RESOURCE ALLOCATION FOR RECONFIGURABLE PROCESSORS;"

U.S. Nonprovisional patent application Ser. No. 17/127, 818, now U.S. Pat. No. 11,182,264 B1, filed Dec. 18, 2020, entitled "INTRA-NODE BUFFER-BASED STREAMING FOR RECONFIGURABLE PROCESSOR-AS-A-SERVICE (RPAAS);"

U.S. Nonprovisional patent application Ser. No. 17/127, 929, now U.S. Pat. No. 11,182,221 B1, filed Dec. 18, 2020, entitled "INTER-NODE BUFFER-BASED STREAMING FOR RECONFIGURABLE PROCESSOR-AS-A-SERVICE (RPAAS);"

U.S. Nonprovisional patent application Ser. No. 17/185, 264, filed Feb. 25, 2021, entitled "TIME-MULTIPLEXED USE OF RECONFIGURABLE HARDWARE;"

U.S. Nonprovisional patent application Ser. No. 17/216, 647, now U.S. Pat. No. 11,204,889 B1, filed Mar. 29, 2021, entitled "TENSOR PARTITIONING AND PARTITION ACCESS ORDER;"

U.S. Nonprovisional patent application Ser. No. 17/216, 650, now U.S. Pat. No. 11,366,783 B1, filed Mar. 29, 2021, entitled "MULTI-HEADED MULTI-BUFFER FOR BUFFERING DATA FOR PROCESSING;"

U.S. Nonprovisional patent application Ser. No. 17/216, 657, now U.S. Pat. No. 11,263,170 B1, filed Mar. 29, 2021, entitled "LOSSLESS TILING IN CONVOLUTION NETWORKS-PADDING BEFORE TILING, LOCATION-BASED TILING, AND ZEROING-OUT;"

U.S. Nonprovisional patent application Ser. No. 17/384, 515, filed Jul. 23, 2021, entitled "LOSSLESS TILING IN CONVOLUTION NETWORKS-MATERIALIZATION OF TENSORS;"

U.S. Nonprovisional patent application Ser. No. 17/216, 651, now U.S. Pat. No. 11,195,080 B1, filed Mar. 29, 2021, entitled "LOSSLESS TILING IN CONVOLUTION NETWORKS-TILING CONFIGURATION;"

U.S. Nonprovisional patent application Ser. No. 17/216, 652, now U.S. Pat. No. 11,227,207 B1, filed Mar. 29, 2021, entitled "LOSSLESS TILING IN CONVOLUTION NETWORKS-SECTION BOUNDARIES;"

U.S. Nonprovisional patent application Ser. No. 17/216, 654, now U.S. Pat. No. 11,250,061 B1, filed Mar. 29, 2021, entitled "LOSSLESS TILING IN CONVOLUTION NETWORKS-READ-MODIFY-WRITE IN BACKWARD PASS;"

U.S. Nonprovisional patent application Ser. No. 17/216, 655, now U.S. Pat. No. 11,232,360 B1, filed Mar. 29, 2021, entitled "LOSSLESS TILING IN CONVOLUTION NETWORKS-WEIGHT GRADIENT CALCULATION;"

U.S. Nonprovisional patent application Ser. No. 17/364, 110, filed Jun. 30, 2021, entitled "LOSSLESS TILING IN CONVOLUTION NETWORKS-TILING CONFIGURATION FOR A SEQUENCE OF SECTIONS OF A GRAPH;"

U.S. Nonprovisional patent application Ser. No. 17/364, 129, filed Jun. 30, 2021, entitled "LOSSLESS TILING IN CONVOLUTION NETWORKS-TILING CONFIGURATION BETWEEN TWO SECTIONS;"

"U.S. Nonprovisional patent application Ser. No. 17/364, 141, filed Jun. 30, 2021, entitled ""LOSSLESS TILING IN CONVOLUTION NETWORKS-PADDING AND RE-TILLING AT SECTION BOUNDARIES;"

U.S. Nonprovisional patent application Ser. No. 17/384, 507, filed Jul. 23, 2021, entitled "LOSSLESS TILING IN CONVOLUTION NETWORKS-BACKWARD PASS;"

U.S. Provisional Patent Application No. 63/107,413, filed Oct. 29, 2020, entitled "SCANNABLE LATCH ARRAY FOR STRUCTURAL TEST AND SILICON DEBUG VIA SCANDUMP;"

U.S. Provisional Patent Application No. 63/165,073, filed Mar. 23, 2021, entitled "FLOATING POINT MULTIPLY-ADD, ACCUMULATE UNIT WITH CARRY-SAVE ACCUMULATOR IN BF16 AND FLP32 FORMAT;"

U.S. Provisional Patent Application No. 63/166,221, filed Mar. 25, 2021, entitled "LEADING ZERO AND LEADING ONE DETECTOR PREDICTOR SUITABLE FOR CARRY-SAVE FORMAT;"

U.S. Provisional Patent Application No. 63/174,460, filed Apr. 13, 2021, entitled "EXCEPTION PROCESSING IN CARRY-SAVE ACCUMULATION UNIT FOR MACHINE LEARNING;"

U.S. Nonprovisional patent application Ser. No. 17/397, 241, now U.S. Pat. No. 11,429,349 B1, filed Aug. 9, 2021, entitled "FLOATING POINT MULTIPLY-ADD, ACCUMULATE UNIT WITH CARRY-SAVE ACCUMULATOR;"

U.S. Nonprovisional patent application Ser. No. 17/216, 509, now U.S. Pat. No. 11,191,182 B1, filed Mar. 29, 2021, entitled "UNIVERSAL RAIL KIT;"

U.S. Nonprovisional patent application Ser. No. 17/379, 921, now U.S. Pat. No. 11,392,740 B2, filed Jul. 19, 2021, entitled "DATAFLOW FUNCTION OFFLOAD TO RECONFIGURABLE PROCESSORS;"

U.S. Nonprovisional patent application Ser. No. 17/379, 924, now U.S. Pat. No. 11,237,880 B1, filed Jul. 19, 2021, entitled "DATAFLOW ALL-REDUCE FOR RECONFIGURABLE PROCESSOR SYSTEMS;"

U.S. Nonprovisional patent application Ser. No. 17/378, 342, now U.S. Pat. No. 11,556,494 B1, filed Jul. 16, 2021, entitled "DEFECT REPAIR FOR A RECONFIGURABLE DATA PROCESSOR;"

U.S. Nonprovisional patent application Ser. No. 17/378, 391, now U.S. Pat. No. 11,327,771 B1, filed Jul. 16, 2021, entitled "DEFECT REPAIR CIRCUITS FOR A RECONFIGURABLE DATA PROCESSOR;"

U.S. Nonprovisional patent application Ser. No. 17/378, 399, now U.S. Pat. No. 11,409,540 B1, filed Jul. 16, 2021, entitled "ROUTING CIRCUITS FOR DEFECT REPAIR FOR A RECONFIGURABLE DATA PROCESSOR;"

U.S. Provisional Patent Application No. 63/220,266, filed Jul. 9, 2021, entitled "LOGIC BIST AND FUNCTIONAL TEST FOR A CGRA;"

U.S. Provisional Patent Application No. 63/195,664, filed Jun. 1, 2021, entitled "VARIATION-TOLERANT VARIABLE-LENGTH CLOCK-STRETCHER MODULE WITH IN-SITU END-OF-CHAIN DETECTION MECHANISM;"

U.S. Nonprovisional patent application Ser. No. 17/338, 620, now U.S. Pat. No. 11,323,124 B1, filed Jun. 3, 2021, entitled "VARIABLE-LENGTH CLOCK STRETCHER WITH CORRECTION FOR GLITCHES DUE TO FINITE DLL BANDWIDTH;"

U.S. Nonprovisional patent application Ser. No. 17/338, 625, now U.S. Pat. No. 11,239,846 B1, filed Jun. 3, 2021, entitled "VARIABLE-LENGTH CLOCK STRETCHER WITH CORRECTION FOR GLITCHES DUE TO PHASE DETECTOR OFFSET;"

U.S. Nonprovisional patent application Ser. No. 17/338, 626, now U.S. Pat. No. 11,290,113 B1, filed Jun. 3, 2021, entitled "VARIABLE-LENGTH CLOCK STRETCHER WITH CORRECTION FOR DIGITAL DLL GLITCHES;"

U.S. Nonprovisional patent application Ser. No. 17/338, 629, now U.S. Pat. No. 11,290,114 B1, filed Jun. 3, 2021, entitled "VARIABLE-LENGTH CLOCK STRETCHER WITH PASSIVE MODE JITTER REDUCTION;"

U.S. Nonprovisional patent application Ser. No. 17/405, 913, now U.S. Pat. No. 11,334,109 B1, filed Aug. 18, 2021, entitled "VARIABLE-LENGTH CLOCK STRETCHER WITH COMBINER TIMING LOGIC;"

U.S. Provisional Patent Application No. 63/230,782, filed Aug. 8, 2021, entitled "LOW-LATENCY MASTER-SLAVE CLOCKED STORAGE ELEMENT;"

U.S. Provisional Patent Application No. 63/236,218, filed Aug. 23, 2021, entitled "SWITCH FOR A RECONFIGURABLE DATAFLOW PROCESSOR;"

U.S. Provisional Patent Application No. 63/236,214, filed Aug. 23, 2021, entitled "SPARSE MATRIX MULTIPLIER;"

U.S. Provisional Patent Application No. 63/389,767, filed Jul. 15, 2022. entitled "PEER-TO-PEER COMMUNICATION BETWEEN RECONFIGURABLE DATAFLOW UNITS;"

U.S. Provisional Patent Application No. 63/405,240, filed Sep. 9, 2022, entitled "PEER-TO-PEER ROUTE THROUGH IN A RECONFIGURABLE COMPUTING SYSTEM."

All of the related application(s) and documents listed above are hereby incorporated by reference herein for all purposes.

FIELD OF THE TECHNOLOGY DISCLOSED

The present technology relates to an improved read-modify-write operation for lossless tiling in convolution networks. Furthermore, the present technology relates to a computer-implemented method for an improved read-modify-write operation for lossless tiling in convolution networks. Moreover, the present technology relates to a non-transitory computer readable storage medium impressed with computer program instructions, the instructions, when executed on a processor, implement a method for an improved read-modify-write operation for lossless tiling in convolution networks.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

With the advent of higher resolution image capturing devices, sizes of image datasets used in various applications are increasing correspondingly. For example, images in 4 k resolution (e.g., 3840×2160 pixel resolution) are now widely available, and even higher resolution images (such as up to, or even higher than 8 k) can be captured. Medical images, such as a three-dimensional (3D) Computerized Tomography (CT) scan or a pathology image, can have 108 to 109, or even higher numbers of pixels. A whole slide image used in medical applications can have billions of pixels.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 7A is a diagram of an illustrative two-dimensional representation of a memory showing a conventional read-modify-write operation and an improved read-modify-write operation.

FIG. 7B is a diagram of an illustrative three-dimensional representation of a memory showing a conventional read-modify-write operation and an improved read-modify-write operation.

DETAILED DESCRIPTION

Figure 1:
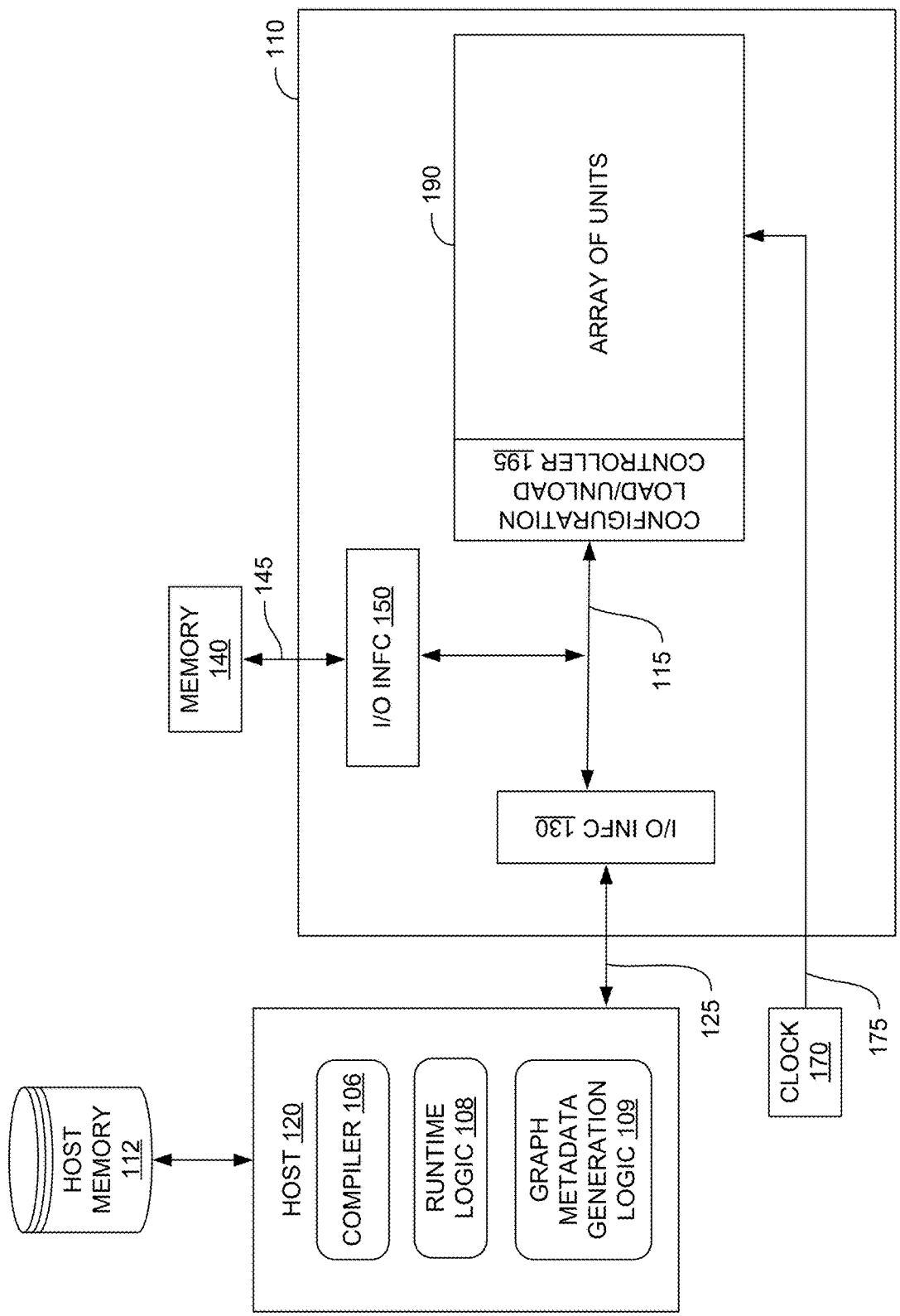
FIG. 1 is a diagram of an illustrative data processing system including a host, a memory, and an example data processor.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Elements referred to herein with a common reference label followed by a particular number or alphabet may be collectively referred to by the reference label alone. For example, tiles 308a, 308b, . . . , 308R (illustrated in FIG. 3) may be collectively and generally referred to as tiles 308 (a-R) or simply as tiles 308 in plural, and tile 308 in singular.

As mentioned in the Background section, sizes of image datasets used in various applications are constantly increasing, and a whole slide image used in medical applications can have billions of pixels.

It is difficult to process such images in machine learning or neural networks, such as Convolutional Neural Networks (CNN), Fully Connected Neural Networks (FCNN), Recurrent Neural Networks (RNN), Long Short-Term Memory (LSTM) networks, autoencoders, deep belief networks, Generative Adversarial Networks (GAN), and/or the like. For example, processing a relatively large sized image requires a corresponding relatively large sized memory and/or large processing power. For example, a single convolution activation of a three-dimensional (3D) image having 512×512×512 pixels and with 64 output channels can occupy about 137 GB Random Access Memory (RAM).

When handling such large sized images, downsampling of the image to a lower resolution is often employed, although such downsampling results in loss of information, which can result in relatively less accurate image analysis results. Alternatively, the image can be split into patches, and different patches can be handled using different models or different neural networks, and a decision fusion model can be used to fuse decisions from the different models. However, such handling of images requires patch level annotations and can be accompanied by other complications. Also, very large input images (e.g., comprising billions of pixels) may not often be satisfactorily processed using the patch-based approach, and the patch-based approach also suffers from insufficient labels usable for image identification tasks.

Yet another approach towards handling relatively large images is to execute data parallelism across spatial dimensions of the image, e.g., using Mesh-TensorFlow, which is a framework for large scale data and model parallelism. With this technique, a 3D U-Net is trained on up to, in an example, 512×512×512 resolution data. For example, the image is spatially partitioned. Each computational device (such as Graphic Processing Units (GPUs) and/or Tensor Processing Units (TPUs)) processes corresponding patches. Before every convolution operation, the computational devices exchange patch margins (e.g., half the size of the convolution kernel) with each other, which results in increased computational burden.

The above discussed procedures and supporting structures for processing such large sized images using machine learning models can be complex, and the execution of the procedures can be time consuming and computationally expensive.

Thus, computationally efficient means for processing such large sized images using machine learning models is desired.

Systems and processes for tiling images that are processed by a neural network (such as a CNN, or another type of neural network) are described with reference to FIG. 1. FIG. 1 shows an architectural level schematic of an illustrative data processing system 100 undertaking tiling decisions and implementing tiling of the various tensors in accordance with an implementation. Because FIG. 1 is an architectural diagram, certain details of the data processing system 100 are intentionally omitted to improve the clarity of the description. It may be noted that data processing system 100 can include the same, more, or fewer elements configured in the same or different manner in other implementations.

As shown in FIG. 1, data processing system 100 includes a host 120, a memory 140, and an example data processor 110. Illustratively, the data processor 110 includes an array 190 of units and a configuration load/unload controller 195. In an implementation, the data processor 110 is a reconfigurable data processor 110, and the array 190 of units comprises an array of configurable units.

Examples of units in the array 190 can include, or can have units configured to implement, a computation unit or a memory unit. Examples of the data processor 110 include Graphics Processing Units (GPUs), Central Processing Units (CPUs), Field Programmable Gate Arrays (FPGAs), Coarse-Grained Reconfigurable Architectures (CGRAs), Application-Specific Integrated Circuits (ASICs), and Application Specific Instruction-set Processors (ASIPs). In an example where the data processor 110 is a reconfigurable data processor, examples of the data processor 110 includes FPGAs, CGRAs, and ASIPs.

Various examples and implementations discussed herein assume that the data processor 110 is a reconfigurable data processor, and units within the array 190 are configurable units. However, such an assumption is to facilitate discussion of the examples and implementations, and not limit the scope of this disclosure. For example, the tiling decisions and tiling of tensors, as discussed throughout this disclosure, can be performed by a reconfigurable data processor, and can also be performed by other data processors (such as GPUs, ASICs, and/or CPUs).

The data processor 110 includes an external I/O interface 130 connected to the host 120 by line 125, and an external I/O interface 150 connected to the memory 140 by line 145. The I/O interfaces 130, 150 connect via a bus system 115 to the array 190 of processing units and to the configuration load/unload controller 195.

The memory 140 is within a chip that is different from a chip comprising the data processor 110, and hence, the memory 140 is also referred to herein as an off-chip memory. In contrast, the reconfigurable array of units 190 comprises configurable memory units (such as local memory 128 illustrated in FIG. 2), which are referred to herein as on-chip memory. Although in some implementations, the memory 140 may be located in the same package as the data processor 110.

As an example, the data processor 110 is a reconfigurable data processor, and the processing units within the array 190 are configurable units, which can be configured to perform specific operations. For example, the array 190 may be an array of configurable units, which includes configurable compute units and configurable memory units in a programmable interconnect fabric. The array of configurable units in a reconfigurable processor is partitionable into a plurality of subarrays (or tiles) of configurable units, as will be discussed herein in turn.

The host 120 executes a compiler 106 that includes compile time logic to compile applications and runtime logic 108 to execute the compiled applications on the data processor 110. The compile time logic and/or the runtime logic may be stored in host memory 112 and executable by one or more processors of host 120.

Illustratively, the compiler 106 compiles a high-level application and generates one or more corresponding configuration files. The runtime logic 108 is configured to load and execute the one or more configuration files on the reconfigurable data processor 110. The reconfigurable data processor 110 is configured to process the configuration files and generate corresponding outputs.

For example, to configure the configurable units in the array 190 of configurable units with a configuration file, the host 120 can send the configuration file to the memory 140 via the I/O interface 130, the bus system 115, and the I/O interface 150 in the reconfigurable data processor 110. The configuration file can be loaded in many ways, as suits a particular architecture, including in data paths outside the data processor 110. The configuration file can be retrieved from the memory 140 via the memory I/O interface 150. Chunks of the configuration file can then be sent in a distribution sequence to configurable units in the array 190 of configurable units in the reconfigurable data processor 110.

The host 120 also executes a graph metadata generation logic 109, which generates graph metadata. For example, as will be discussed herein in further detail, individual tensors processed by the neural network executed in the data processing system 100 can be divided in multiple tiles, and graph metadata associated with a tensor stores tiling information associated with the tensor.

An external clock generator 170 or other clock line sources can provide a clock line 175 or clock lines to elements in the reconfigurable data processor 110, including the array 190 of configurable units, and the bus system 115, and the external data I/O interfaces. The bus system 115 can communicate data at a processor clock rate via a clock line 175 or clock lines.

Figure 2:
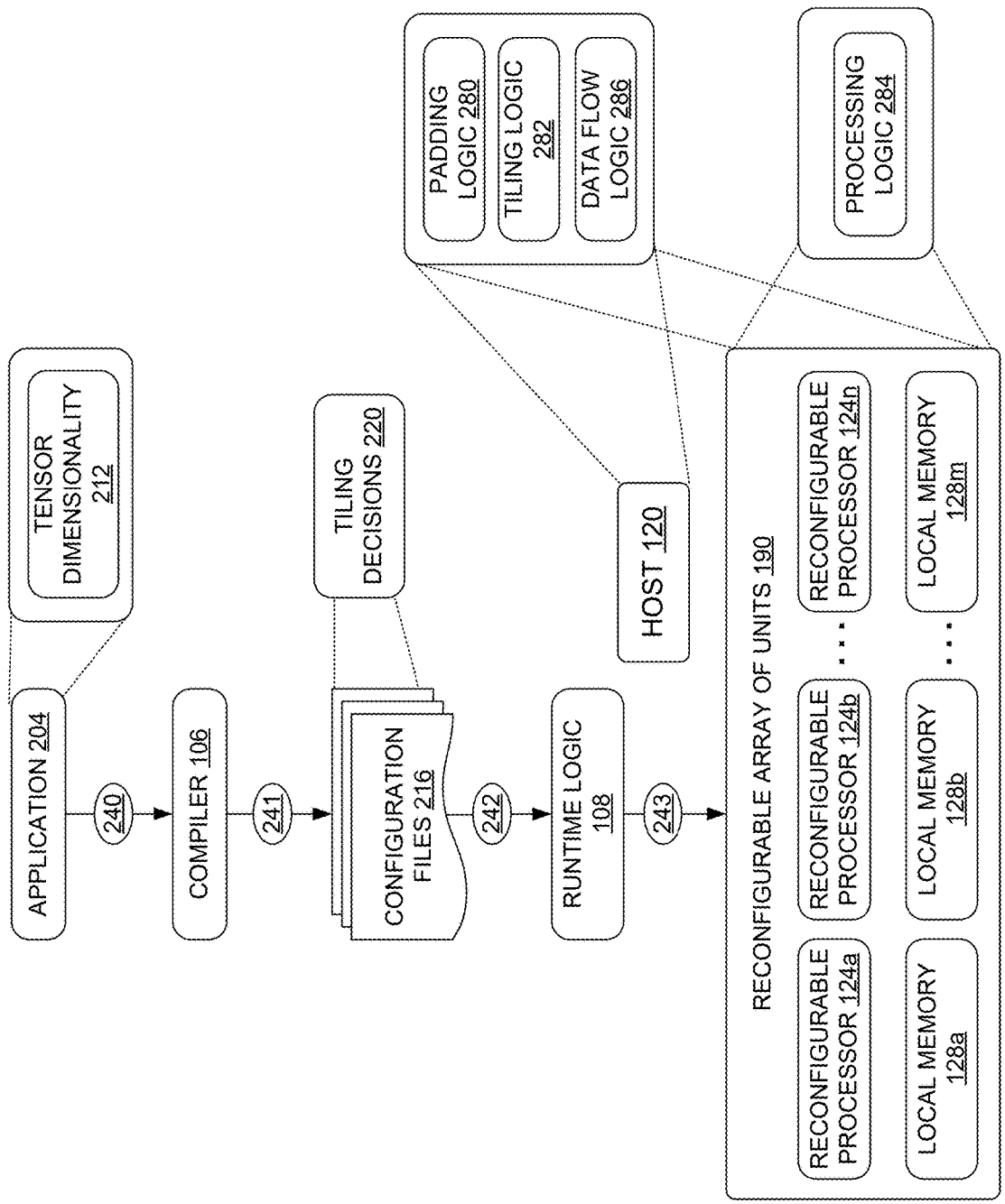
FIG. 2 is a diagram of illustrative compilation and execution of configuration files in the data processing system of FIG. 1.

FIG. 2 illustrates compilation and execution of configuration files in the data processing system 100 of FIG. 1. At operation 240, the compiler 106 receives an application 204 for compilation. The application, for example, is a neural network application. The application involves processing tensors using a neural network, such as a CNN. In an implementation, the application 204 includes information (such as metadata) specifying tensor dimensionality 212, which provides dimensions of input tensors, output tensors, and/or one or more intermediate tensors.

At operation 241, the compile time logic in the compiler 106 compiles the application 204 to generate one or more configuration files 216. One or more of the configuration files 216 is sometimes also referred to as a graph, and the compile time logic in the compiler 106 is said to configure the graph.

The configuration files 216 include a plurality of functions. Examples of functions in the plurality of functions include, but are not limited to, non-linearities like Rectified Linear Unit (ReLU) and its variants (e.g., leaky ReLU), convolution, transpose convolution, hyperbolic tangent, sigmoid, and softmax, element-wise addition, matrix multiplication (e.g., General Matrix Multiply (GeMM)), layer normalization (e.g., batch normalization), loss functions like cross-entropy, and tensor shape modifiers like transpose.

In an implementation, the configuration files 216 also include tiling decisions 220. For example, at operation 241, the compile time logic has configured the graph to generate a plurality of tiles of a tensor and conserves the information related to the generation of the plurality of tiles as tiling decisions 220. If desired, the tiling decisions 220 may be included in metadata included in the configuration files 216. Tiling decisions 220 provide dimensionality and/or number of tiles in various tensors received, generated, and/or output by the data processing system 100 of FIG. 1 while executing the configuration files 216.

At operation 242, the compiler 106 sends the configuration files 216 to the runtime logic 108 for execution. At operation 243, the runtime logic 108 loads the configuration files 216 (or at least sections of the configuration files 216) and/or the data therefor (e.g., weights, coefficients, vectors, tensors (image data, audio data, natural language processing (NLP data)), control data (e.g., control tokens)) on one or more of reconfigurable processors 124a, 124b, ..., 124N and/or reconfigurable local memory 128a, 128b, ..., 128M of the reconfigurable array of units 190. In an implementation, the reconfigurable array of units 190 implements processing logic 284 that processes the various functions included in the configuration files 216.

In an implementation, the reconfigurable array of units 190 and/or the host 120 also executes one or more of padding logic 280 that pads an input tensor with zero-valued peripheral components, tiling logic 282 that tiles (or re-tiles) a tensor into multiple corresponding tiles, and data flow logic 286 that facilitates materializing individual tiles (e.g., by storing the tiles to the off-chip memory 140 of FIG. 1) and facilitates reading individual tiles from the memory 140 of FIG. 1.

In some implementations, compiler 106 and/or runtime logic 108 may be part of host 120 (e.g., as shown in FIG. 1). In other implementations, compiler 106 and/or runtime logic 108 may be separate from host 120.

Having described the reconfigurable processor, the discussion now turns to a manner in which tensors are processed by the reconfigurable processor.

Figure 3:
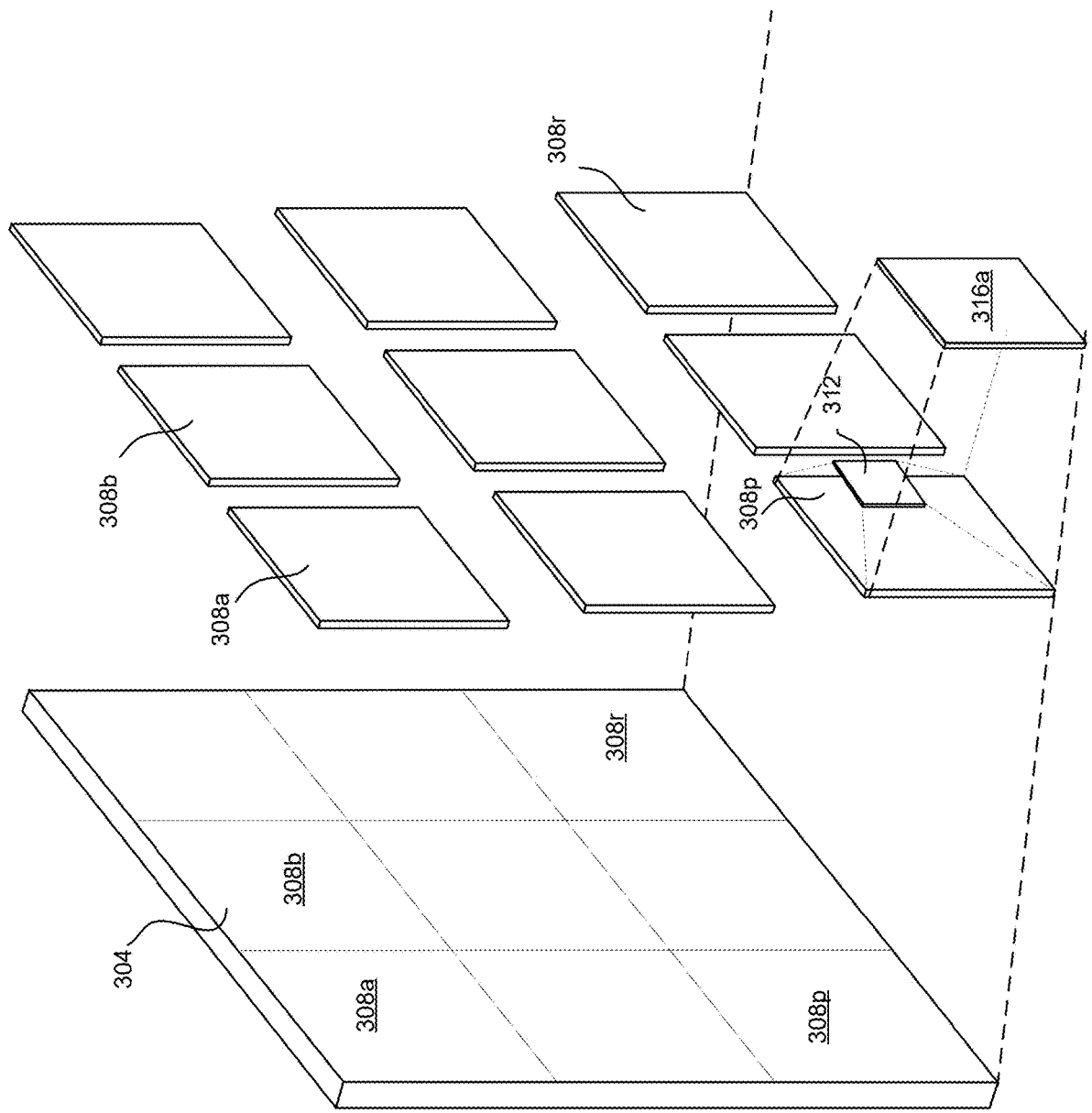
FIG. 3 is a diagram of an illustrative tiling of a tensor into a plurality of tiles and subsequent convolution of the tiles without overlaps between neighboring tiles in the tensor.

Tiling is often employed to process large sized tensors. In tiling, an input tensor is tiled or divided into multiple tiles or sections, during a forward pass and/or a backward pass of a neural network. FIG. 3 illustrates tiling of a tensor 304 into a plurality of tiles 308a, ..., 308R and subsequent convolution of the tiles, where there are no overlaps among neighboring tiles. FIG. 3 illustrates a 3D perspective view of the tiling process merely for illustration purposes. Note that the underlying tensor 304 can be a 2D or a 3D image, or is derived from such an image (e.g., by convoluting the image and/or otherwise processing the image). In the example of FIG. 3, the tiles 308a, ..., 308R are non-overlapping tiles, e.g., two neighboring tiles do not have any overlapping region.

Illustratively, the tiles 308a, ..., 308R may be convolved with a kernel 312 during a convolution operation to generate corresponding tiles. As shown in FIG. 3, tile 308p is convolved with kernel 312 to generate tile 316a. Similarly, the remaining tiles of tiles 308a, ..., 308R may be convolved with kernel 312 to generate corresponding tiles, if desired.

Figure 4:
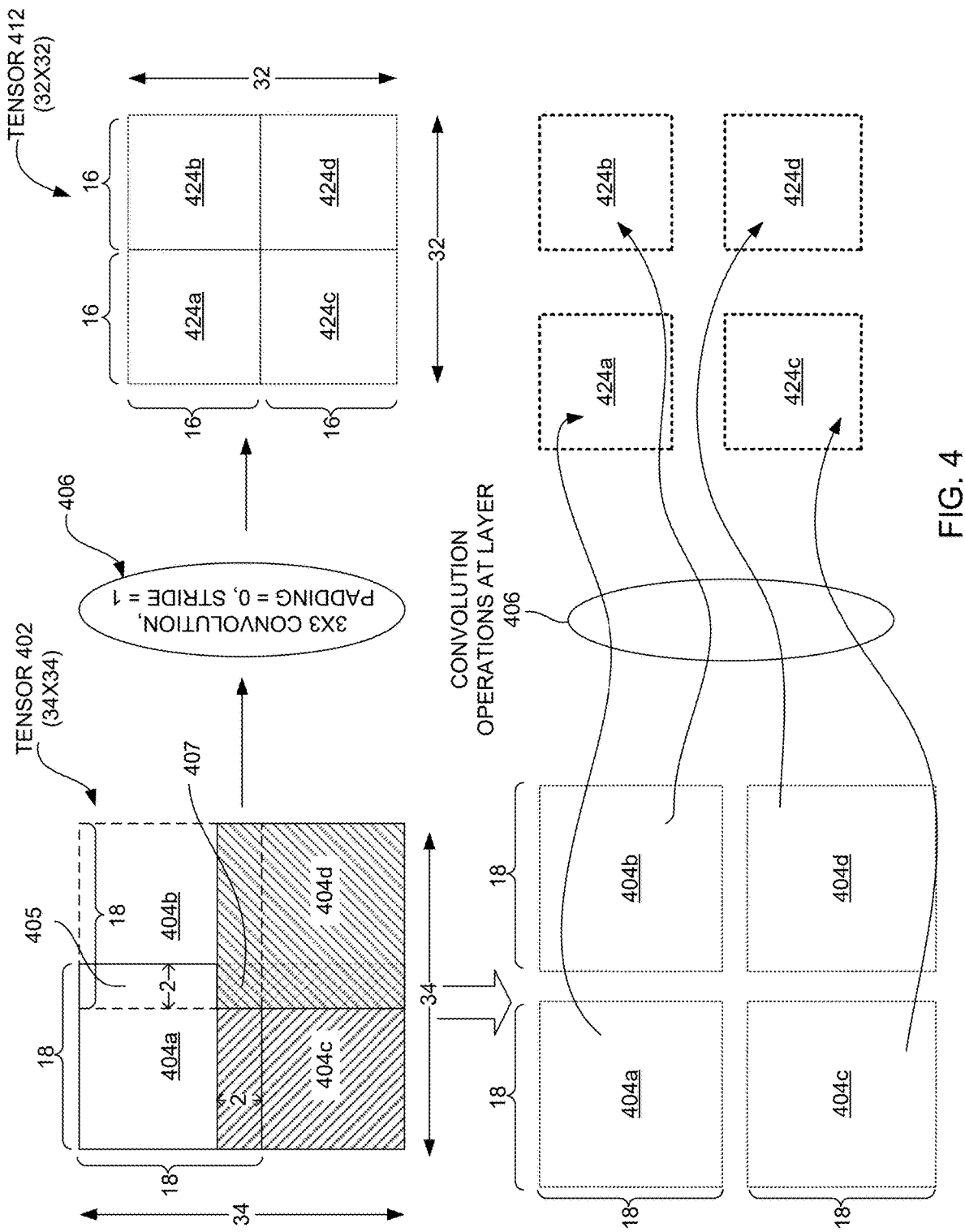
FIG. 4 is a diagram of an illustrative tiling of a tensor into a plurality of tiles and subsequent convolution of the tiles, where neighboring tiles in the tensor partially overlap.

FIG. 4 illustrates tiling of an input tensor 402 into a plurality of tiles 404a, ..., 404d and subsequent convolution of the tiles, where neighboring tiles in the input tensor 402 partially overlap. Although FIG. 4 illustrates the input tensor 402 being tiled into four tiles, such a number of tiles is merely an example and is not intended to limit the scope of this disclosure. In other examples, the input tensor 402 can be tiled into a higher number of tiles, such as 9, 16, 25, 64, or higher, and is implementation specific. In an example, the number of tiles is based on a variety of factors, such as a size of the input tensor 402, a memory and/or processing capacity of the network processing the tensors, a configuration (such as a number of layers) of the network, and/or the like.

As shown in FIG. 4, neighboring tiles 404a, ..., 404d in the input tensor 402 partially overlap. FIG. 4 also illustrates example dimensions of various tiles, and dimensions of the overlapping sections. The dimensions are mere examples and are not intended to limit the scope of the disclosure. For example, the input tensor 402 has a dimension of 34×34 components, and individual tiles 404a, ..., 404d have a dimension of 18×18 components. Thus, in an implementation, each tile within the input tensor 402 has the same dimension.

Two tiles in a tensor are neighboring tiles if the two tiles have at least one immediate adjacent edge and/or an immediate adjacent corner. Thus, in the input tensor 402 that is divided into four tiles, each tile is a neighboring tile to the other tiles. Thus, each tile has three neighboring tiles in the input tensor 402. For example, a right section of the tile 404a overlaps with a left section of the tile 404b, to generate an overlapping section 405 comprising 18×2 components. Thus, components within the overlapping section 405 are common to both tiles 404a and 404b. Similarly, a 2×18 bottom section of the tile 404a overlaps with a 2×18 top section of the tile 404c, and a 2×2 right-bottom section of the tile 404a overlaps with a left-top section of the tile 404d. As illustrated, the central 2×2 overlap region 407 is common to all the four tiles 404a, ..., 404d.

Also illustrated in FIG. 4 is a convolution operation within a processing node or layer 406 of a neural network, in which a kernel is convolved with each tile 404a, ..., 404d, to generate a corresponding tile 424a, ..., 424d of an output tensor 412. The lower portion of FIG. 4 illustrates how each individual tile 404a, ..., 404d is convolved with the kernel 406 to generate a corresponding tile 424a, ..., 424d. Note that the lower portion of FIG. 4 shows the tiles in non-overlapping manner, for clearly depicting the tile-wise convolution operations. For example, tile 404a is convolved to generate a corresponding tile 424a, tile 404b is convolved to generate a corresponding tile 424b, and so on. The output tensor 412 is a combination of the tiles 424a, ..., 424d. Although not illustrated, the tiles 424a, ..., 424d can be further convolved or processed by another operation (e.g., max-pooling) within the neural network.

To generate an output tile of a certain size, the corresponding input tile size is determined from the receptive field of the filter used for the convolution operation. For example, a tiling that is to be performed at a section output is initially determined. Then, using the information about the receptive field of each operation in the section, an algorithm works backwards through the section until it reaches the input. In other words, the tile size of the output is used to calculate the tile size of the input. During a convolution operation, dimensions of an input tile (e.g., input tile 404a of the input tensor 402) can be different from the dimensions of the corresponding output tile (e.g., output tile 424a of the output tensor 412). For example, an output width Wo and an output height Ho of the output receptive field is given by:

$$W_o = \frac{W_i - K_w + P_w}{S_w} + 1 \quad (1)$$

$$H_o = \frac{H_i - K_h + P_h}{S_h} + 1 \quad (2)$$

In equations (1) and (2), $W_i$ and $H_i$ are a width and a height, respectively, of the input tile; $K_w$ and $K_h$ are a width and a height, respectively, of the convolution kernel used during the convolution operation; $P_w$ and $P_h$ are convolution padding used in horizontal and vertical directions, respectively of the convolution operation; and $S_w$ and $S_h$ are strides in horizontal and vertical directions, respectively, of the convolution operation.

For example, for FIG. 4, assume that the underlying convolution 406 uses a 3×3 filter with a stride of 1 and equal padding. The output 412 is a 32×32 tensor that is split into four non-overlapping 16×16 tiles 424a, ..., 424d. When tiling is enabled, the convolution to generate each output tile 424a, ..., 424d is performed as a valid padding convolution that uses a corresponding input tile 404a, ..., 424d of size 18×18 from an input tensor 402 of size 34×34.

Figure 5:
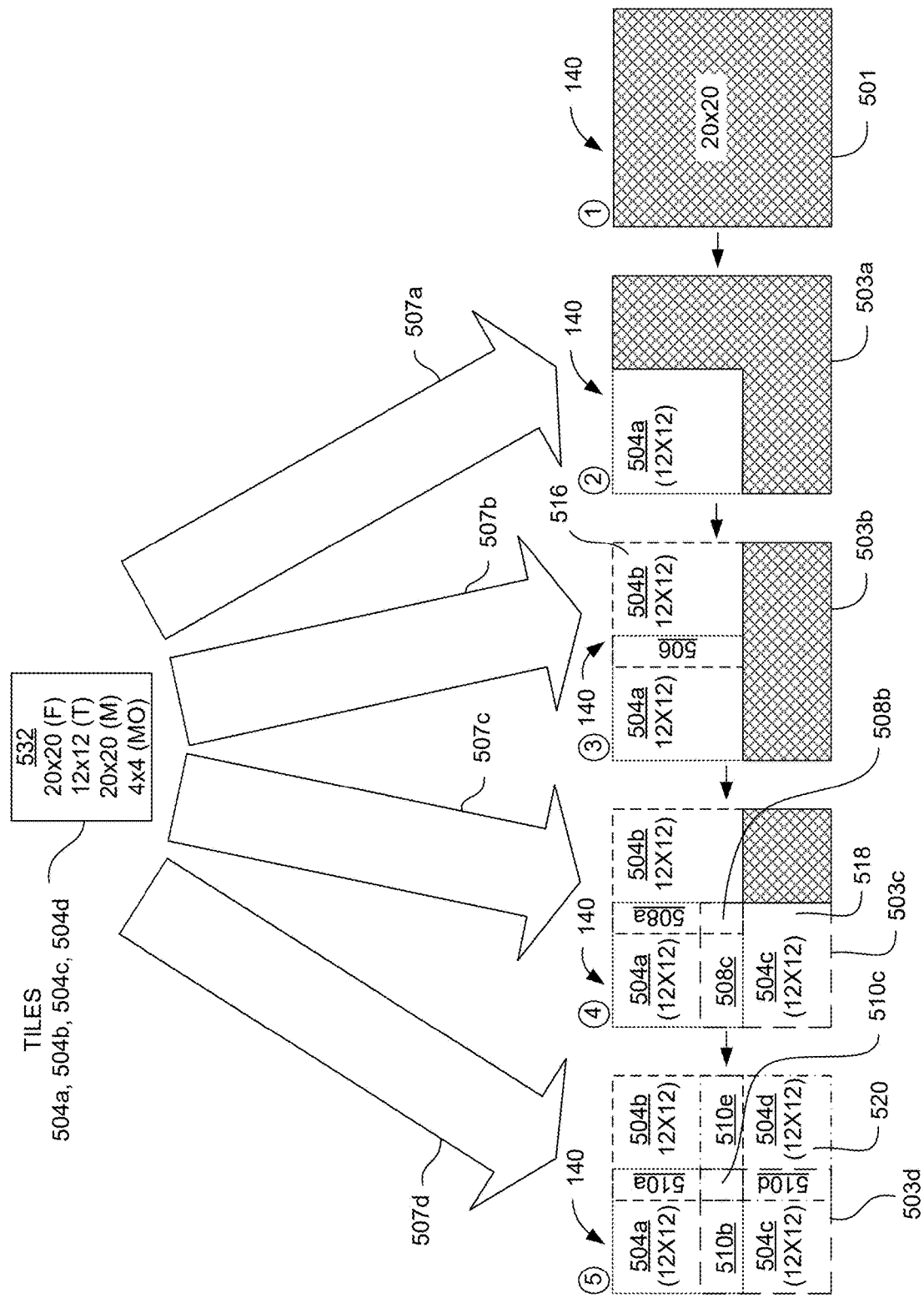
FIG. 5 is a diagram of an illustrative read-modify-write operation to transform an output of an output layer of a backward section to an input of an input layer of a subsequent backward section.

FIG. 5 illustrates a "read-modify-write" operation, for example to transform an output tensor 532 of an output layer of a backward pass section to an input of an input layer of a subsequent backward pass section. The "read-modify-write" operation may be performed at a section boundary of a backward pass.

The corresponding processing graph that implements the backward pass may be used to implement a neural network, such as a CNN, a FCNN, an RNN, a LSTM network, an autoencoder, a deep belief network, a GAN, and/or the like.

Consider the scenario in which compile time logic (e.g., compile time logic of compiler 106 of FIG. 1 or FIG. 2) has configured a graph to generate a plurality of tiles 504a, 504b, 504c, 504d of a tensor 532. For example, the graph may implement at least a portion of a backward pass of a convolution operation. Consider further that runtime logic (e.g., runtime logic 108 of FIG. 1 or FIG. 2) is configured to execute the graph to generate, at the output of the graph, the plurality of tiles 504a, 504b, 504c, 504d of tensor 532 and perform operations 1 to 5 shown in FIG. 5.

As shown in FIG. 5, tensor 532 has a size 20×20 (F), where "(F)" indicates that the tensor 532 has an actual or full size of 20×20 components. Individual ones of the tiles 504a, 504b, 504c, 504d have a size of 12×12, as indicated by the notation (T) within the tensor 532. Individual ones of the tiles 504a, 504b, 504c, 504d have a size 20×20 (M), which indicates that the tensor 532 has a size of 20×20 when materialized and stored in the memory 140. Accordingly, the tiles 504a, 504b, 504c, 504d have an overlap of 4×4 (MO) in the memory 140. The read-modify-write operation illustrated in FIG. 5 shows how the tiles 504a, 504b, 504c, 504d are stored in the memory 140.

In FIG. 5, there are four arrow-shapes 507a, ..., 507d, that indicate corresponding actions associated with a corresponding tile of the tiles 504a, 504b, 504c, 504d. A bottom section of FIG. 5, from right to left, shows a manner in which the tiles 504a, 504b, 504c, 504d are written to the memory 140. Various operations are indicated by a corresponding number within an oval.

Referring to the bottom-right section of FIG. 5 and in the scenario described above, at operation 1, a 20×20 memory 140 comprising corresponding 20×20 content 501 is initialized to zero, and is reserved or allocated for storing the tiles 504a, 504b, 504c, 504d of the tensor 532. Thus, the 20×20 data or content 501 has zero values stored in the memory 140.

At operation 2, a current memory region in memory 140 is determined for storing a current tile 504a of the plurality of tiles. As shown in FIG. 5, the current memory region includes the top left 12×12 elements of memory 140. Since no neighboring tiles (i.e., tiles 504b, 504c, 504d) of the current tile 504a have been written to memory 140, the data of the current tile 504a is written to the current memory region, as illustrated symbolically using the arrow 507a. The memory now has content 503a.

At operation 3, a current memory region in memory 140 is determined for storing a current tile 504b of the plurality of tiles. As shown in FIG. 5, the current memory region includes the top right 12×12 elements of memory 140 including an overlapping memory region 506 of size 12×4 that stores data from the write operation of previously stored neighboring tile 504a and a remaining memory region 516 of size 12×8 in the top right corner of memory 140.

A read-modify-write operation is performed on the data from the overlapping memory region 506 using the data from the overlapping memory region 506 (i.e., data in a 12×4 section on a right periphery of tile 504a) and data from the current tile 504b for storing in the overlapping memory region (i.e., data in a 12×4 section on a left periphery of tile 504b).

For example, data stored in the overlapping memory region 506 of the memory 140 is read (e.g., by the processors 124 of FIG. 2) without reading the zeros from the remaining memory region 516, combined (e.g., added, multiplied, or combined by applying any other operation) with the corresponding data from the current tile 504b (i.e., data in the 12×4 section on a left periphery of tile 504b) to generate modified data, and the modified data is written back to the overlapping memory region 506 of the memory 140.

The remaining tile data (i.e., data in a 12×8 section on the right periphery) of the current tile 504b is written to the remaining memory region 516 (i.e. the 12×8 region in the top right corner of memory 140). Operation 3 is illustrated symbolically using the arrow 507b. The memory 140 now has content 503b.

At operation 4, the current memory region in memory 140 that is determined for storing a current tile 504c of the plurality of tiles includes the bottom left 12×12 elements of memory 140 including an overlapping memory region 508b, 508c of size 4×12 and a remaining memory region 518 of 8×12 in the bottom left corner of memory 140.

The overlapping memory region 508b, 508c stores data from the write operation of previously stored neighboring tile 504a in portion 508c of the overlapping memory region 508b, 508c and data from the write operations of previously stored neighboring tiles 504a, 504b in portion 508b of the overlapping memory region 508b, 508c.

A read-modify-write operation is performed on the data from the overlapping memory region 508b, 508c using the data from the overlapping memory region 508b, 508c and data from the current tile 504c for storing in the overlapping memory region (i.e., data in a 4×12 section on a top periphery of tile 504c).

For example, data stored in the overlapping memory region 508b, 508c of the memory 140 is read (e.g., by the processors 124 of FIG. 2) without reading the zeros from the remaining memory region 518, combined (e.g., added, multiplied, or combined by applying any other operation) with the corresponding data from the current tile 504c (i.e., data in the 4×12 section on a top periphery of tile 504c) to generate modified data, and the modified data is written back to the overlapping memory region 508b, 508c of the memory 140. The remaining tile data (i.e., data in an 8×12 section on the bottom periphery) of the current tile 504c is written to the remaining memory region 518 (i.e. the 8×12 region in the bottom left corner of memory 140). Operation 4 is illustrated symbolically using the arrow 507c. The memory now has content 503c.

At operation 5, the current memory region in memory 140 that is determined for storing a current tile 504d of the plurality of tiles includes the bottom right 12×12 elements of memory 140 including an overlapping memory region 510c, 510d, 510e having an L-shape of size 4×12 and 12×4 and a remaining memory region 520 of 8×8 in the bottom right corner of memory 140.

The overlapping memory region 510c, 510d, 510e stores data from the write operation of previously stored neighboring tile 504b in portion 510e, from the write operation of previously stored neighboring tile 504c in portion 510d, and data from the write operations of previously stored neighboring tiles 504a, 504b, 504c in portion 510c of the overlapping memory region 510c, 510d, 510e.

A read-modify-write operation is performed on the data from the overlapping memory region 510c, 510d, 510e using the data from the overlapping memory region 510c, 510d, 510e and data from the current tile 504d for storing in the overlapping memory region (i.e., data in the 4×12 and 12×4 L-shaped section on a top and left periphery of tile 504d).

For example, data stored in the overlapping memory region 510c, 510d, 510e of the memory 140 is read (e.g., by the processors 124 of FIG. 2) without reading the zeros from the remaining memory region 520, combined (e.g., added, multiplied, or combined by applying any other operation) with the corresponding data from the current tile 504d (i.e., data in the L-shaped section on the top and left periphery of tile 504d) to generate modified data, and the modified data is written back to the overlapping memory region 510c, 510d, 510e of the memory 140. The remaining tile data (i.e., data in the 8×8 section on the bottom right periphery) of the current tile 504d is written to the remaining memory region 520 (i.e. the 8×8 region in the bottom right corner of memory 140). Operation 5 is illustrated symbolically using the arrow 507d. The memory now has content 503d.

The content 503d is the 20×20 output tensor 532, with four tiles 504a, 504b, 504c, and 504d, with an overlap of width 4 in the memory 140. As discussed, the output tensor 532 is saved in the memory 140.

FIG. 5 shows an illustrative graph with four tiles of a tensor. However, any number of tiles of a tensor may be generated and stored in memory.

Figure 6:
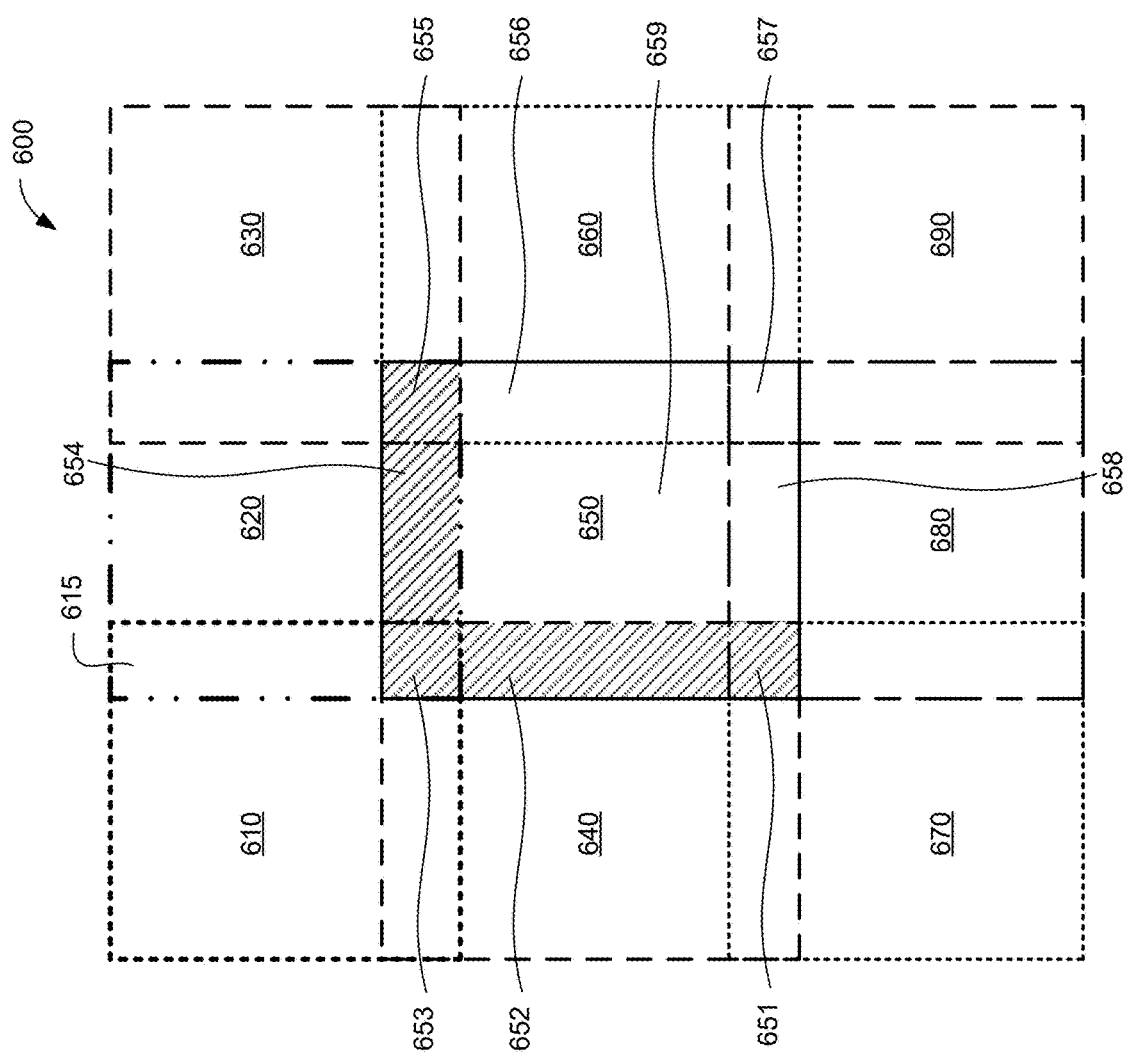
FIG. 6 is a diagram of an illustrative improved read-modify-write operation.

FIG. 6 is a diagram of an illustrative improved read-modify-write operation with nine tiles having overlapping memory regions between neighboring tiles when stored in memory 600. Consider the scenario in which memory 600 has been initialized with all zeros and in which tiles 610, 620, 630, and 640 of a tensor have already been written to the memory 600 with overlapping memory regions. In this scenario, tile 650 is the current tile to be written to memory 600. The current memory region in memory 600 for storing the current tile 650 includes the L-shaped overlapping memory region 651, 652, 653, 654, 655 that stores data from write operations of previously stored neighboring tiles 610, 620, 630, and 640 and the remaining memory region 656, 657, 658, 659 which includes all zeros since the neighboring tiles 660, 670, 680, and 690 of current tile 650 have not been written to memory 600 in this example.

Storing tile 650 to memory 600 includes a read-modify-write operation on the data from the overlapping memory region 651, 652, 653, 654, 655 and the corresponding data in the L-shaped top left periphery of tile 650. In the current scenario, the read-modify-write operation includes reading the data from the L-shaped overlapping memory region 651, 652, 653, 654, 655 without reading the zeros from the remaining memory region 656, 657, 658, 659, combining the data in the top left L-shaped periphery of tile 650 with the data from the L-shaped overlapping memory region 651, 652, 653, 654, 655 to generate modified data, and writing the modified data to the overlapping memory region. Illustratively, storing tile 650 to memory 600 includes a write operation of the remaining data of tile 650 (i.e., data other than the data in the top left L-shaped periphery of tile 650) to the remaining memory region 656, 657, 658, 659.

In FIG. 5, one out of four overlapping memory regions were L-shaped. However, four out of nine overlapping memory regions were L-shaped in FIG. 6. Thus, in the Examples of FIG. 5 and FIG. 6, the number of L-shaped overlapping memory regions increases with the ratio of total tiles to be stored in memory divided by number of tiles on the left and top border of the memory.

Figure 8:
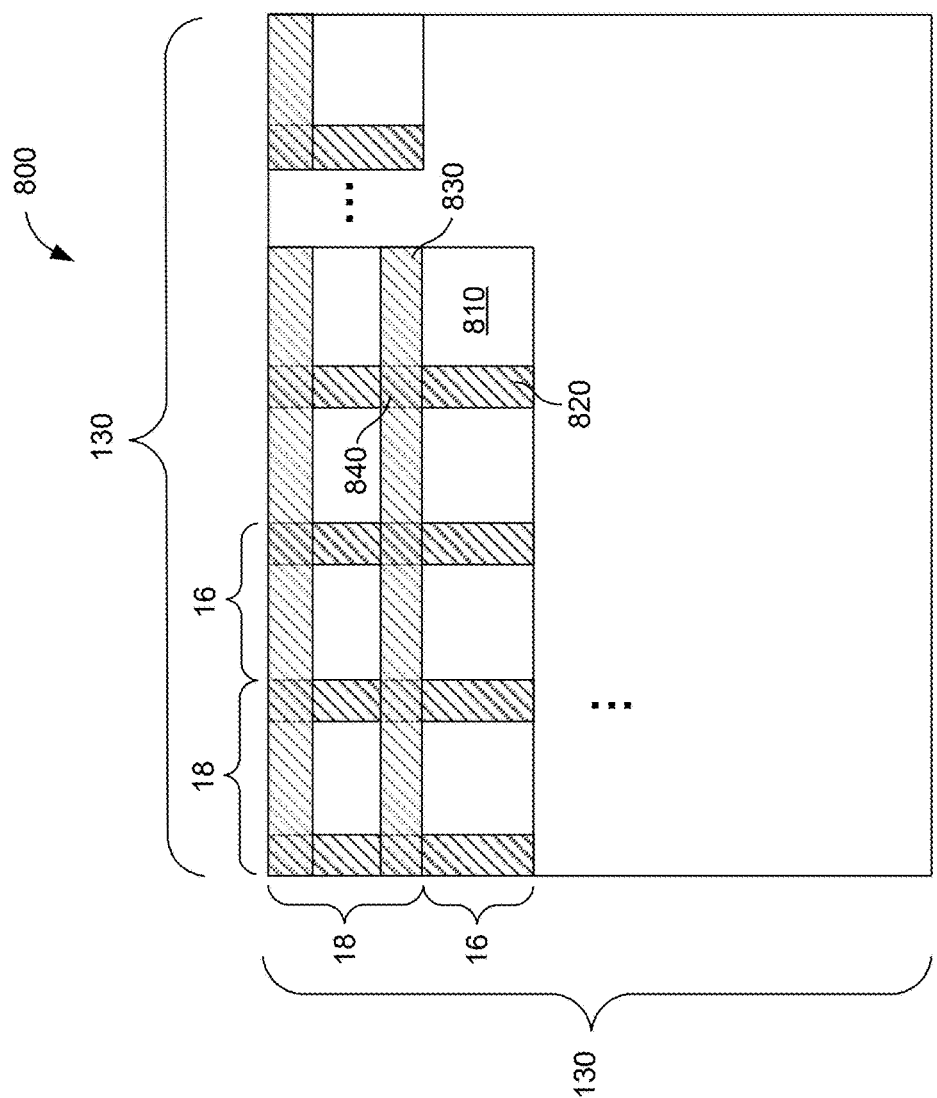
FIG. 8 is a diagram of an illustrative 130×130 tensor being tiled into 18×18 tiles with an overlap of two in both dimensions and stored in memory.

In the examples of FIGS. 5 and 6, the tensor is divided in four and nine tiles, respectively. In other examples, the tensor may be divided in many more tiles. Illustratively, the example of FIG. 8 shows a tensor that is divided in 64 tiles. With an increasing number of tiles, it may be desirable to always perform a read-modify-write operation for storing the top leftmost periphery of a tensor, even for the top left tile that is stored first in memory. In the example of FIG. 6, this would imply that when tile 610 is written to memory 600, a read-modify-write operation is performed on the L-shaped top and leftmost portion of the memory 600 even though this region stores zeros at this point in time. Similarly, when tile 620 is written to memory 600, a read-modify-write operation is performed not only on the portion of the memory 615 that stores data from tile 610, but also the topmost region of the memory that stores zeros at this point in time.

In the examples of FIGS. 5 and 6, we have assumed that the tiles are written row by row from top to bottom, within the row from left to write, starting with the top left corner of the memory. However, the tiles may be written to the memory in any other way. For example, the tiles may be written to the memory row by row, within the row from left to right or right to left, starting with the uppermost row or the lowermost row, or any combination thereof, or the tiles may be written to the memory column by column, within the column from top to bottom or bottom to top, starting with the leftmost column or the rightmost column, or any combination thereof.

As an example, the tiles may be written to the memory column by column from left to right and within the columns from top to bottom starting with the leftmost column of the memory. As another example, the tiles may be written to the memory column by column from right to left and within the columns from top to bottom starting with the rightmost column of the memory. As yet another example, the tiles may be written to the memory column by column from left to right and within the columns from bottom to top starting with the leftmost column of the memory.

Therefore, without loss of generality, we assume hereinafter that the tiles are written to the memory row by row from top to bottom (i.e., starting with the uppermost row) and within the rows from left to right (i.e., starting with the top left memory region).

FIG. 7A is a diagram of an illustrative two-dimensional representation of a current memory region 710 for storing a current tile of a tensor showing on the left-hand side of FIG. 7A that all elements 725 of the two-dimensional current memory region 710 is read in a conventional read-modify-write operation of the current tile of the tensor, and showing on the right-hand side of FIG. 7A that elements in an L-shaped portion 720 of the two-dimensional current memory region 710 is read in an improved read-modify-write operation of the current tile of the tensor.

In the improved read-modify-write operation of the current tile that is depicted on the right side of FIG. 7A, a counter may determine the length of an overlapping memory region 720 that stores data from previously written neighboring tiles in a first dimension. If desired, the improved read-modify-write operation may use conditional logic to determine whether an element of the current memory region 710 lies within the overlapping memory region based on the counter.

In some implementations of the read-modify-write operation of the example of FIG. 7A, when the current tile is written row-by-row to the current memory region 710, the read-modify-write operation may read data from entire rows of the current memory region 710 for as long as the counter that has been initialized to zero is smaller than the number of entire rows 735 of the overlapping memory region 720 and read data only from the leftmost columns 730 for the remaining rows of the current memory region 710.

In other implementations of the read-modify-write operation of the example of FIG. 7A, when the tile is written column-by-column to the current memory region 710, the read-modify-write operation may read data from entire columns of the current memory region 710 for as long as the counter that has been initialized to zero is smaller than the number of entire columns 730 of the overlapping memory region 720 and read data only from the top rows 735 for the remaining columns of the current memory region 710.

FIG. 7B is a diagram of an illustrative three-dimensional representation of a current memory region 760 for storing a current tile of a tensor showing on the left-hand side of FIG. 7B that all elements 775 of the two-dimensional current memory region 760 is read in a conventional read-modify-write operation of the tile of the tensor, and showing on the right-hand side of FIG. 7B that elements in a limited portion 770 of the three-dimensional current memory region 760 is read in an improved read-modify-write operation of the tile of the tensor.

In the improved read-modify-write operation of the tile that is depicted on the right side of FIG. 7B, a counter may determine the length 780 of an overlapping memory region 770 that stores data from previously written neighboring tiles in a first dimension (e.g., height), and an additional counter may determine the length 785 of the overlapping memory region 770 in a second dimension (e.g., width). In some implementations, the length 780 of the overlapping memory region 770 in the first dimension may be the same than the length 785 of the overlapping memory region 770 in the second dimension. In other implementations, the length 780 of the overlapping memory region 770 in the first dimension may be different than the length 785 of the overlapping memory region 770 in the second dimension. If desired, the improved read-modify-write operation may use conditional logic to determine whether an element of the current memory region 760 lies within the overlapping memory region 770 based on the counter and the additional counter.

Thus, as shown on the right-hand side of FIG. 7B, the read-modify-write operation may read data from entire planes in width and depth direction of the current memory region 760 for as long as the counter that has been initialized to zero is smaller than the height 780 and read data only up to depth 790 for the remaining planes in width and depth direction of the current memory region 710. Similarly, the read-modify-write operation may read data from entire planes in height and depth direction of the current memory region 760 for as long as the additional counter that has been initialized to zero is smaller than the width 785 and read data only up to depth 790 for the remaining planes in height and depth direction.

Illustratively, a two-dimensional memory may be allocated for storing a two-dimensional tensor, a three-dimensional memory may be allocated for storing a three-dimensional tensor, and an N-dimensional memory may be allocated for an N-dimensional tensor. As shown in FIG. 7A, an improved read-modify-write operation on a two-dimensional memory uses a single counter. As shown in FIG. 7B, an improved read-modify-write operation on a three-dimensional memory uses two counters. A counter may be added for each additional dimension. Thus, an improved read-modify-write operation on an N-dimensional tensor uses (N−1) counters.

Consider the scenario in which a tensor with shape 64×130×130 and integer components is tiled into 64 tiles with shape 64×18×18 and overlap 0, 2, 2. Thus, the tensor tiles overlap by two in the second and third dimension. A conventional read-modify-write operation reads the entire memory content for every tile. Each tile is of size 64×18×18×4 bytes (assuming that an integer is stored using 4 bytes). Thus, reading one tile transfers about 83 KB of data. Since the tensor has 64 tiles, a total data transfer size of about 5.3 MB is required for the conventional read-modify-write operation.

FIG. 8 is a diagram of the second and third dimensions of the illustrative 64×130×130 tensor. Tiling the 130×130 second and third dimensions into the tiles of size 18×18 with an overlap of two results in an arrangement of 8×8 tiles (i.e., in each dimension 18 elements for the first tile and 16 elements for each additional tile due to the overlap).

An improved read-modify-write operation reads data from the overlapping memory region that stores data from write operation of previously stored neighboring tiles. For example, a read-modify-write operation of tile 810 reads the data in the L-shaped memory region 820, 830, 840 only. Regions 820 and 830 include 16×2 components of the tensor each, and region 840 includes 2×2 components of the tensor in second and third dimensions. The tensor has 64 components in the first dimension, and there are 64 tiles overall. Thus, the improved read-modify-write operation requires a total data transfer size of (16×2×2+2×2)×4 bytes×64×64 for a total of about 1.1 MB.

Figure 9:
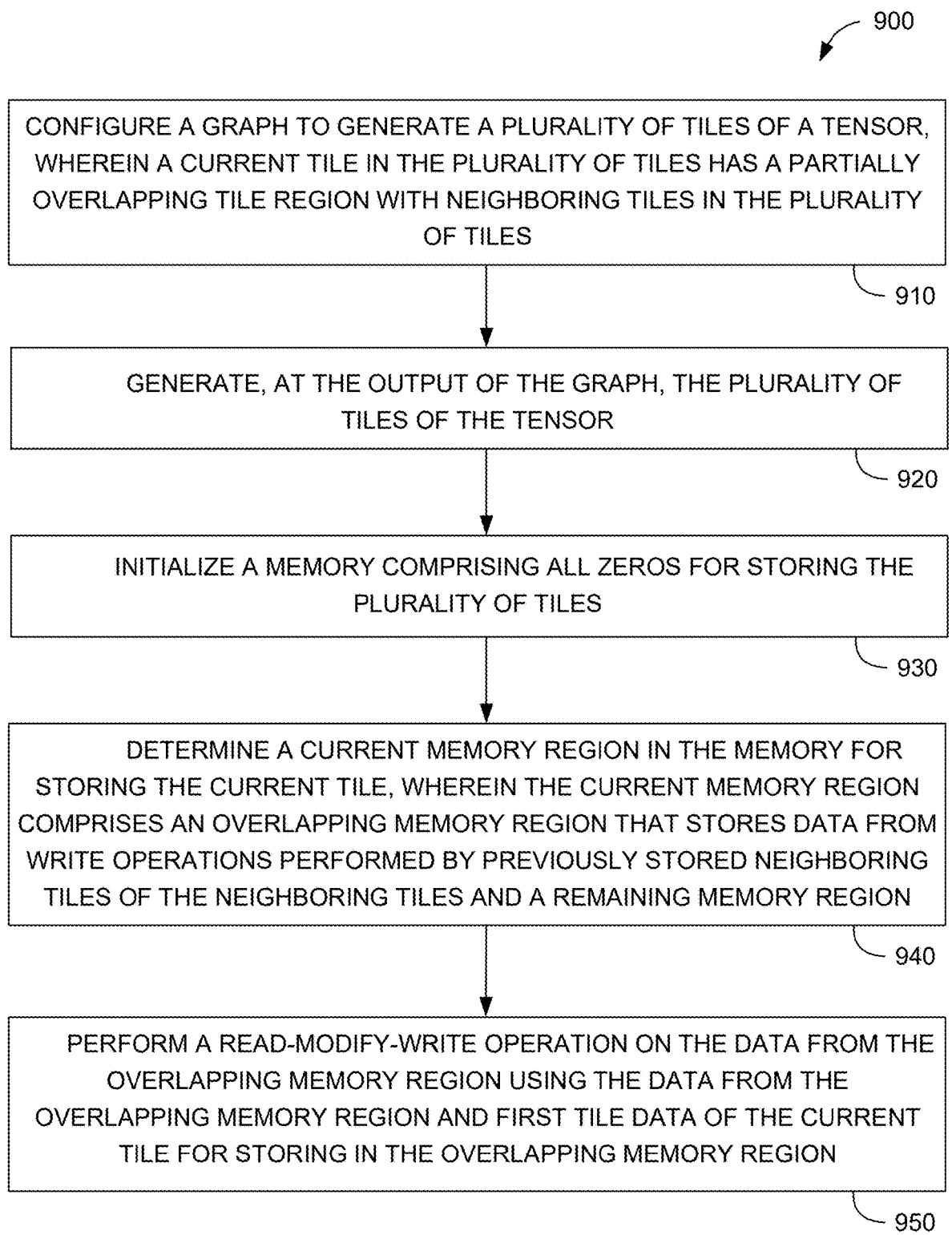
FIG. 9 is a flowchart showing illustrative operations that compile time logic and runtime logic perform for implementing an improved read-modify-write operation.

FIG. 9 is a flowchart 900 showing illustrative operations that compile time logic and runtime logic (e.g., compile time logic of compiler 106 of FIG. 1 or FIG. 2 and runtime logic 108 of FIG. 1 or FIG. 2) perform for implementing an improved read-modify-write operation.

During operation 910, the compile time logic configures a graph to generate a plurality of tiles of a tensor, wherein a current tile in the plurality of tiles has a partially overlapping tile region with neighboring tiles in the plurality of tiles.

For example, the compile time logic of compiler 106 of FIG. 2 may configure a graph that includes the 20×20 tensor of the example of FIG. 5 to generate four tiles 504a, 504b, 504c, 504d having tile sizes of 12×12. Thus, tile 504d has a partial overlapping tile region with neighboring tiles 504a, 504b, 504c.

During operation 920, the runtime logic generates, at the output of the graph, the plurality of tiles of the tensor.

For example, the runtime logic 108 of FIG. 1 or FIG. 2 may generate the tiles 504a, 504b, 504c, 504d of tensor 532 of FIG. 5.

During operation 930, the runtime logic initializes a memory comprising all zeros for storing the plurality of tiles.

For example, the runtime logic 108 of FIG. 1 or FIG. 2 may initialize memory 140 of FIG. 5 to include all zeros for storing tiles 504a, 504b, 504c, 504d.

During operation 940, the runtime logic determines a current memory region in the memory for storing the current tile, wherein the current memory region comprises an overlapping memory region that stores data from write operations of previously stored neighboring tiles of the neighboring tiles and a remaining memory region.

For example, the runtime logic 108 of FIG. 1 or FIG. 2 may determine a current memory region in memory 140 of FIG. 5, whereby the current memory region includes an overlapping memory region 510c, 510d, 510e that stores data from write operations of previously stored neighboring tiles 504a, 504b, and 504c and a remaining memory region 520.

During operation 950, the runtime logic performs a read-modify-write operation on the data from the overlapping memory region using the data from the overlapping memory region and first tile data of the current tile for storing in the overlapping memory region.

For example, the runtime logic 108 of FIG. 1 or FIG. 2 may perform a read-modify-write operation on the data from the overlapping memory region 510c, 510d, 510e using the data from the overlapping memory region and data from the top and left periphery of tile 504d.

Illustratively, the runtime logic may write remaining tile data of the current tile to the remaining memory region. For example, the runtime logic 108 of FIG. 1 or FIG. 2 may write the remaining data of tile 504d to the remaining memory region 520.

In some implementations, performing the read-modify-write operation on the data from the overlapping memory region may include: reading the data from the overlapping memory region without reading zeros from the remaining memory region, combining first tile data of the current tile for storing in the overlapping memory region with the data from the overlapping memory region to generate modified data, and writing the modified data to the overlapping memory region.

For example, the runtime logic 108 of FIG. 1 or FIG. 2 may perform the read-modify-write operation on the data from the overlapping memory region 510c, 510d, 510e of FIG. 5 by reading the data from the overlapping memory region 510c, 510d, 510e without reading zeros from the remaining memory region 520, combining first tile data of tile 504d in the top and leftmost parts of the tile 504d with the data from the overlapping memory region 510c, 510d, 510e to generate modified data, and writing the modified data to the overlapping memory region 510c, 510d, 510e.

If desired, combining first tile data of the current tile with the data from the overlapping memory region to generate the modified data further may include adding the first tile data of the current tile to the data from the overlapping memory region.

Illustratively, reading the data from the overlapping memory region may include determining a first length of the overlapping memory region in a first dimension.

For example, the runtime logic 108 of FIG. 1 or FIG. 2 may determine the height 780 of the overlapping memory region 770 of memory 760 of FIG. 7 (e.g., using a counter, if desired).

By way of example, the runtime logic may determine a second length of the overlapping memory region in a second dimension.

For example, the runtime logic 108 of FIG. 1 or FIG. 2 may determine the width 785 of the overlapping memory region 770 of memory 760 of FIG. 7 (e.g., using an additional counter, if desired).

In some implementations, the first length of the overlapping memory region in the first dimension is different than the second length of the overlapping memory region in the second dimension. In other implementations, the first length of the overlapping memory region in the first dimension is equal to the second length of the overlapping memory region in the second dimension.

Illustratively, the graph implements at least a portion of a backward pass of a convolution operation.

While the present technology is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

As will be appreciated by those of ordinary skill in the art, aspects of the presented technology may be embodied as a system, device, method, or computer program product apparatus. Accordingly, elements of the present disclosure may be implemented entirely in hardware, entirely in software (including firmware, resident software, micro-code, or the like) or in software and hardware that may all generally be referred to herein as a "apparatus," "circuit," "circuitry," "module," "computer," "logic," "FPGA," "unit," "system," or other terms.

Furthermore, aspects of the presented technology may take the form of a computer program product embodied in one or more computer-readable medium(s) having computer program code stored thereon. The phrases "computer program code" and "instructions" both explicitly include configuration information for a CGRA, an FPGA, or other programmable logic as well as traditional binary computer instructions, and the term "processor" explicitly includes logic in a CGRA, an FPGA, or other programmable logic configured by the configuration information in addition to a traditional processing core. Furthermore, "executed" instructions explicitly includes electronic circuitry of a CGRA, an FPGA, or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory.

A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of the present technology may be written in any combination of one or more programming languages, including object-oriented programming languages such as Java, Python, C++, or the like, conventional procedural programming languages, such as the "C" programming language or similar programming languages, or low-level computer languages, such as assembly language or microcode. In addition, the computer program code may be written in VHDL, Verilog, or another hardware description language to generate configuration instructions for an FPGA, CGRA IC, or other programmable logic.

The computer program code if converted into an executable form and loaded onto a computer, FPGA, CGRA IC, or other programmable apparatus, produces a computer implemented method. The instructions which execute on the computer, FPGA, CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

Example 1 is a data processing system, comprising a storage medium, one or more processors coupled to the storage medium, and runtime logic stored in the storage medium and executable in any one of the one or more processors, wherein the runtime logic is configured to execute a graph to: generate, at the output of the graph, a plurality of tiles of a tensor; initialize a memory comprising all zeros for storing the plurality of tiles; determine a current memory region in the memory for storing a current tile of the plurality of tiles, wherein the current memory region comprises an overlapping memory region that stores data from write operations of previously stored neighboring tiles of the plurality of tiles and a remaining memory region, and perform a read-modify-write operation on the data from the overlapping memory region using the data from the overlapping memory region and first tile data of the current tile for storing in the overlapping memory region.

In Example 2 the runtime logic of Example 1 is further configured to execute the graph to write remaining tile data of the current tile to the remaining memory region.

In Example 3, to perform the read-modify-write operation on the data from the overlapping memory region, the runtime logic of Example 1 is further configured to execute the graph to: read the data from the overlapping memory region without reading zeros from the remaining memory region; combine first tile data of the current tile for storing in the overlapping memory region with the data from the overlapping memory region to generate modified data; and write the modified data to the overlapping memory region.

In Example 4, to generate the modified data, the runtime logic of Example 3 is further configured to execute the graph to add the first tile data of the current tile to the data from the overlapping memory region.

In Example 5, to read the data from the overlapping memory region, the runtime logic of Example 3 is further configured to execute the graph to determine a first length of the overlapping memory region in a first dimension with a counter.

In Example 6, to read the data from the overlapping memory region, the runtime logic of Example 5 is further configured to execute the graph to determine a second length of the overlapping memory region in a second dimension with an additional counter.

In Example 7, the first length of the overlapping memory region in the first dimension of Example 6 is different than the second length of the overlapping memory region in the second dimension.

In Example 8, to read the data from the overlapping memory region, the runtime logic of Example 5 is further configured to execute the graph to use conditional logic to determine whether an element of the current memory region lies within the overlapping memory region based on the counter.

In Example 9, the graph of Example 1 implements at least a portion of a backward pass of a convolution operation.

Example 10 is a computer-implemented method, comprising: configuring a graph to generate a plurality of tiles of a tensor, wherein a current tile in the plurality of tiles has a partially overlapping tile region with neighboring tiles in the plurality of tiles; generating, at the output of the graph, the plurality of tiles of the tensor; initializing a memory comprising all zeros for storing the plurality of tiles; determining a current memory region in the memory for storing the current tile, wherein the current memory region comprises an overlapping memory region that stores data from write operations of previously stored neighboring tiles of the neighboring tiles and a remaining memory region; and performing a read-modify-write operation on the data from the overlapping memory region using the data from the overlapping memory region and first tile data of the current tile for storing in the overlapping memory region.

In Example 11, the method of Example 10 further comprises writing remaining tile data of the current tile to the remaining memory region.

In Example 12, performing the read-modify-write operation on the data from the overlapping memory region of Example 10 further comprises: reading the data from the overlapping memory region without reading zeros from the remaining memory region; combining first tile data of the current tile for storing in the overlapping memory region with the data from the overlapping memory region to generate modified data; and writing the modified data to the overlapping memory region.

In Example 13, combining first tile data of the current tile with the data from the overlapping memory region to generate the modified data of Example 12 further comprises: adding the first tile data of the current tile to the data from the overlapping memory region.

In Example 14, reading the data from the overlapping memory region of Example 12 further comprises: determining a first length of the overlapping memory region in a first dimension.

In Example 15, the method of Example 14 further comprises: determining a second length of the overlapping memory region in a second dimension.

In Example 16, the first length of the overlapping memory region in the first dimension of Example 15 is different than the second length of the overlapping memory region in the second dimension.

In Example 17, the graph of Example 10 implements at least a portion of a backward pass of a convolution operation.

Example 18 is a non-transitory computer readable storage medium impressed with computer program instructions, the instructions, when executed on a processor, implement a method comprising: configuring a graph to generate a plurality of tiles of a tensor, wherein a current tile in the plurality of tiles has a partially overlapping tile region with neighboring tiles in the plurality of tiles; generating, at the output of the graph, the plurality of tiles of the tensor; initializing a memory comprising all zeros for storing the plurality of tiles; determining a current memory region in the memory for storing the current tile, wherein the current memory region comprises an overlapping memory region that stores data from write operations of previously stored neighboring tiles of the neighboring tiles and a remaining memory region; and performing a read-modify-write operation on the data from the overlapping memory region using the data from the overlapping memory region and first tile data of the current tile for storing in the overlapping memory region.

In Example 19, the non-transitory computer readable storage medium of Example 18 further comprises writing remaining tile data of the current tile to the remaining memory region.

In Example 20, performing the read-modify-write operation on the data from the overlapping memory region of Example 18 further comprises: reading the data from the overlapping memory region without reading zeros from the remaining memory region; combining first tile data of the current tile for storing in the overlapping memory region with the data from the overlapping memory region to generate modified data; and writing the modified data to the overlapping memory region.

What is claimed is:
1. A data processing system, comprising:
a storage medium;
one or more processors coupled to the storage medium; and
runtime logic that is stored in the storage medium and executable in any one of the one or more processors, wherein the runtime logic is configured to execute a graph to:
generate, at the output of the graph, a plurality of tiles of a tensor;
initialize a memory comprising all zeros for storing the plurality of tiles;
determine a current memory region in the memory for storing a current tile of the plurality of tiles, wherein the current memory region comprises an overlapping memory region that stores data from write operations of previously stored neighboring tiles of the plurality of tiles and a remaining memory region; and perform a read-modify-write operation on the data from the overlapping memory region using the data from the overlapping memory region and first tile data of the current tile for storing in the overlapping memory region, wherein to perform a read-modify-write operation on the data from the overlapping memory region, the runtime logic is further configured to execute the graph to:

read the data from the overlapping memory region without reading zeros from the remaining memory region, combine first tile data of the current tile for storing in the overlapping memory region with the data from the overlapping memory region to generate modified data, and write the modified data to the overlapping memory region.

2. The data processing system of claim 1, wherein the runtime logic is further configured to execute the graph to:
write remaining tile data of the current tile to the remaining memory region.

3. The data processing system of claim 1, wherein to generate the modified data, the runtime logic is further configured to execute the graph to:
add the first tile data of the current tile to the data from the overlapping memory region.

4. The data processing system of claim 1, wherein to read the data from the overlapping memory region, the runtime logic is further configured to execute the graph to:
determine a first length of the overlapping memory region in a first dimension with a counter.

5. The data processing system of claim 4, wherein to read the data from the overlapping memory region, the runtime logic is further configured to execute the graph to:
determine a second length of the overlapping memory region in a second dimension with an additional counter.

6. The data processing system of claim 5, wherein the first length of the overlapping memory region in the first dimension is different than the second length of the overlapping memory region in the second dimension.

7. The data processing system of claim 4, wherein to read the data from the overlapping memory region, the runtime logic is further configured to execute the graph to:
use conditional logic to determine whether an element of the current memory region lies within the overlapping memory region based on the counter.

8. The data processing system of claim 1, wherein the graph implements at least a portion of a backward pass of a convolution operation.

9. A computer-implemented method, comprising:
configuring a graph to generate a plurality of tiles of a tensor, wherein a current tile in the plurality of tiles has a partially overlapping tile region with neighboring tiles in the plurality of tiles;

generating, at the output of the graph, the plurality of tiles of the tensor;

initializing a memory comprising all zeros for storing the plurality of tiles;

determining a current memory region in the memory for storing the current tile, wherein the current memory region comprises an overlapping memory region that stores data from write operations of previously stored neighboring tiles of the neighboring tiles and a remaining memory region; and performing a read-modify-write operation on the data from the overlapping memory region using the data from the overlapping memory region and first tile data of the current tile for storing in the overlapping memory region, wherein performing the read-modify-write operation on the data from the overlapping memory region further comprises:

reading the data from the overlapping memory region without reading zeros from the remaining memory region, combining first tile data of the current tile for storing in the overlapping memory region with the data from the overlapping memory region to generate modified data, and writing the modified data to the overlapping memory region.

10. The method of claim 9, further comprising:
writing remaining tile data of the current tile to the remaining memory region.

11. The method of claim 9, wherein combining first tile data of the current tile with the data from the overlapping memory region to generate the modified data further comprises:
adding the first tile data of the current tile to the data from the overlapping memory region.

12. The method of claim 9, wherein reading the data from the overlapping memory region further comprises:
determining a first length of the overlapping memory region in a first dimension.

13. The method of claim 12, further comprising:
determining a second length of the overlapping memory region in a second dimension.

14. The method of claim 13, wherein the first length of the overlapping memory region in the first dimension is different than the second length of the overlapping memory region in the second dimension.

15. The method of claim 9, wherein the graph implements at least a portion of a backward pass of a convolution operation.

16. A non-transitory computer readable storage medium impressed with computer program instructions, the instructions, when executed on a processor, implement a method comprising:

configuring a graph to generate a plurality of tiles of a tensor, wherein a current tile in the plurality of tiles has a partially overlapping tile region with neighboring tiles in the plurality of tiles;

generating, at the output of the graph, the plurality of tiles of the tensor;

initializing a memory comprising all zeros for storing the plurality of tiles;

determining a current memory region in the memory for storing the current tile, wherein the current memory region comprises an overlapping memory region that stores data from write operations of previously stored neighboring tiles of the neighboring tiles and a remaining memory region; and performing a read-modify-write operation on the data from the overlapping memory region using the data from the overlapping memory region and first tile data of the current tile for storing in the overlapping memory region, wherein performing the read-modify-write operation on the data from the overlapping memory region further comprises:
reading the data from the overlapping memory region without reading zeros from the remaining memory region,
combining first tile data of the current tile for storing in the overlapping memory region with the data from the overlapping memory region to generate modified data, and
writing the modified data to the overlapping memory region.

17. The non-transitory computer readable storage medium of claim 16, further comprising:
writing remaining tile data of the current tile to the remaining memory region.

* * * * *